Aug. 30, 1960

R. B. BLACKMAN 2,950,863

APPARATUS FOR THE SOLUTION OF PLANE TRIANGLES

Filed Oct. 28, 1943

INVENTOR
R. B. BLACKMAN
BY
J. H. Heydt
ATTORNEY

Aug. 30, 1960

R. B. BLACKMAN 2,950,863

APPARATUS FOR THE SOLUTION OF PLANE TRIANGLES

Filed Oct. 28, 1943

$a, b, \alpha$ GIVEN
$\alpha < 90°$ $a, b, \alpha$ GIVEN
$\alpha > 90°$

INVENTOR
*R. B. BLACKMAN*
BY
*G. H. Heydt.*
ATTORNEY

United States Patent Office 2,950,863
Patented Aug. 30, 1960

2,950,863

APPARATUS FOR THE SOLUTION OF PLANE TRIANGLES

Ralph B. Blackman, Cranford, N.J., assignor to Bell Telephone Laboratories, Incorporated, New York, N.Y., a corporation of New York Filed Oct. 28, 1943, Ser. No. 508,053

28 Claims. (Cl. 235—190)

This invention relates to an improvement in computing devices adapted to the solution of a plane triangle of which three elements, at least one being a side of the triangle, are initially given. The invention comprises a system of electromechanical apparatus in a novel arrangement of known electrical and mechanical appliances and a method of operation whereby the apparatus of the invention is enabled automatically to compute from the given data the unknown elements of the triangle and conveniently to display the computed results.

A prominent feature of the invention is the provision of two servomotors, the rotations of which cooperatively determine the values of the triangle elements initially unknown.

The general object of the invention is therefore to provide an electromechanical system whereby a plane triangle may be automatically solved. Inasmuch as the apparatus components of the system to be specifically described below may individually be replaced by other equivalent apparatus, another object of the invention is to provide a method of solving a plane triangle wherein the lengths of the sides of such triangle are represented by electrical quantities appropriately operated upon to furnish the solution desired.

In the apparatus to be described the lengths of the sides of the triangle are individually represented by voltages and two of these representative voltages are fractionated proportionately to the sines and cosines of the angles adjacent the third side. The sine fraction voltages are applied in opposition to determine the rotation of a first servomotor, while the sum of the cosine fraction voltages is opposed to the voltage representative of the third side and the net voltage so obtained determines the rotation of the second servomotor, each servomotor coming to rest when the net voltage supplied it vanishes.

The rotations and rest positions of the two motors may be repeated, by using known circuit arrangements, to control motors driving massive equipment located at a distance from the point of computation. It is accordingly another object of the invention to provide an apparatus capable of the automatic solution of a plane triangle in such fashion that the computed results may be telemetrically repeated to any desired distance.

The apices of the triangle to be solved may be a gun emplacement, a target to be fired upon, and an observing station. The known sides may be the range, optically or otherwise determined, from the observing station to the target and the known distance between this station and the gun, while the angle included by these sides is the relative bearing of gun and target with respect to the observer. In such a problem the unknown side is the range from gun to target and one of the unknown angles is the relative bearing of observer and target with respect to the gun. Obviously the computation of these unknown quantities by the observer is of the first importance when the gun and target are not intervisible and by the present invention these computations are automatically carried out by apparatus at the observing station, resulting in data which may be instantaneously transmitted to the gun position as an automatic training drive for the gun and as range information for setting the gun sight.

Accordingly, another object of the invention is to facilitate the control of gun fire.

The invention by which these objects are obtained, its apparatus and the method of using it, will be clear from the following description of a preferred embodiment read with reference to the accompanying drawings, in all of which corresponding elements are designated by like numerals and in which.

It will be understood that the various apparatus components of Figs. 1 to 4 are suitably supported by any well-known means, not shown.

The problems solved by this invention may be classified in three cases, depending on the initial data. In case I, two sides and one angle are given, and this angle may be either the angle included by the given sides or an angle adjacent one of those sides; in the latter case, the given angle may be either less or greater than a right angle. In case II one side and two angles are given and either or both the given angles may be adjacent the given side. In case III, the three sides are given.

Figure 5:
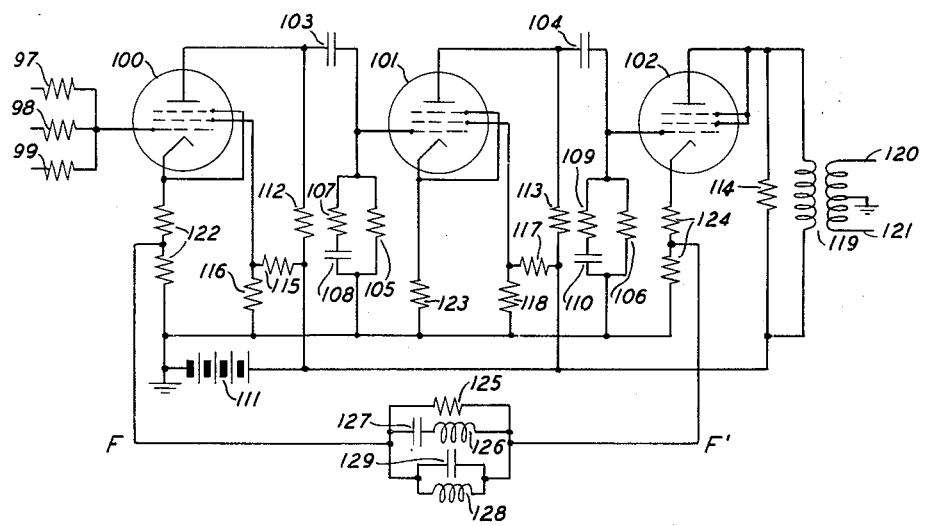
Fig. 5 is a schematic diagram of the circuit of one of the motor control amplifiers used in the circuit of Fig. 4.
Figure 6:
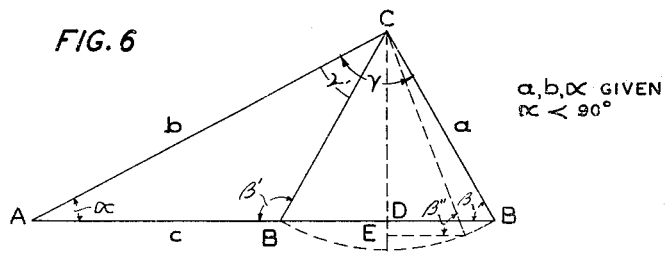
Figs. 6 and 7 are triangles drawn to illustrate a certain procedure in the use of the circuit of Fig. 4.
Figure 7:
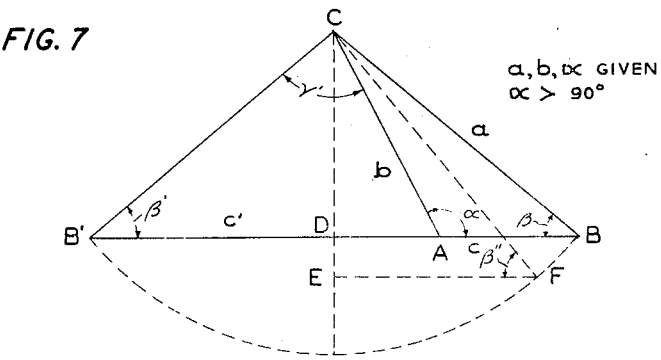

In the plane triangle ABC, Figs. 6 and 7, altitude CD is equal to $b \sin \alpha$ and also to $a \sin \beta$ and $c$ equals the sum of $b \cos \alpha$ and $a \cos \beta$ where $a$, $b$ and $c$ are the sides of the triangle ABC and $\alpha$, $\beta$ and $\gamma$, respectively, are the angles opposite these sides. In the present invention, sides $a$, $b$ and $c$ are represented preferably by alternating voltages of any convenient frequency and means are provided whereby the voltages representing the sides $a$ and $b$ may be fractionated proportionally to the sines and to the cosines of the angles $\beta$ and $\alpha$, respectively. For convenience of description, it will be assumed in Figs. 1 and 4 that the apparatus of the invention has solved a right triangle, finding $c=8.50$ thousand yards, $\alpha=40.3$ degrees and $\beta=49.7$ degrees, there being initially given $a=5.50$ thousand yards, $b=6.48$ thousand yards and $\gamma=90$ degrees. The mechanical elements of the invention will be described with reference to Figs. 1 to 3, the electrical elements with reference to Figs. 4 and 5.

MECHANICAL SYSTEM

Figure 1:
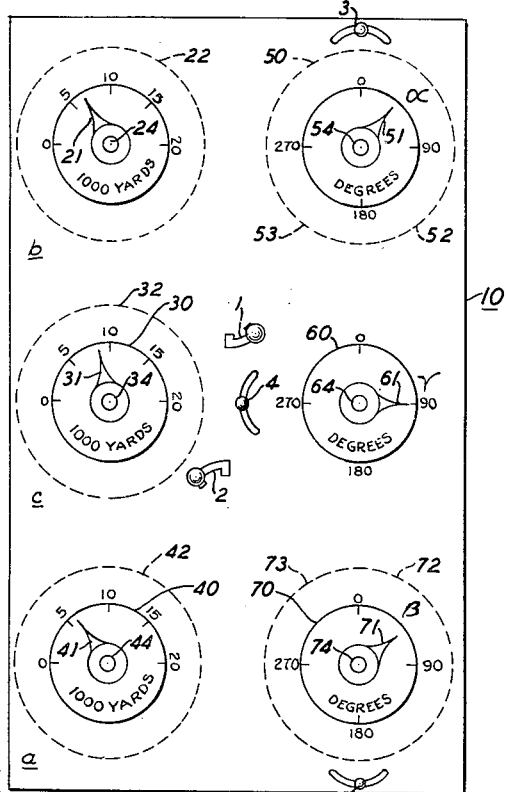
Fig. 1 is a plan view of the panel constituting the cover of the apparatus of the invention.

Referring to Fig. 1, on panel 10 are mounted annular dials 20, 30 and 40 graduated in distance units, on which are indicated the lengths of sides $b$, $c$ and $a$ by pointers 21, 31 and 41, turning with vertical shafts 24, 34 and 44, respectively. Dashed outlines 22, 32 and 42 represent potentiometers supported beneath panel 10 in any convenient way, not shown, and centered with respect to the corresponding dials 20, 30 and 40. To the right of the column of distance dials on panel 10 are mounted annular dials 50, 60 and 70 on which by pointers 51, 61 and 71 turning with vertical shafts 54, 64 and 74, are indicated the angles α, γ and β, respectively. Dials 50, 60 and 70 are complete circles graduated in degrees clockwise while dials 20, 30 and 40 need be, if desired, only semicircles. It will be noted that the angles opposite sides *b* and *a* are indicated on dials diagonally opposite the corresponding distance dials, while the angle opposite side *c* is read on a dial directly opposite the distance dial on which side *c* is indicated. Dashed outlines 52, 53 and 72, 73 again represent potentiometers centered with respect to dials 50 and 70, respectively, and conveniently supported beneath panel 10; these potentiometers together with those represented by dashed outlines 22, 32 and 42, will be described in connection with Fig. 4.

Through slots in panel 10 protrude gear shift levers 1 and 2, serving the purpose of controlling the mechanical application of the servomotors to be later described. Clamping levers 3, 4 and 5, likewise protruding through slots in panel 10, serve to clamp or to release shafts 54, 64 and 74, respectively. As will be apparent later, friction is relied on to preserve initial settings of pointers 21, 31 and 41, but where any of pointers 51, 61 and 71 is to remain in an initial setting, the corresponding shaft requires to be positively clamped.

The vertical shafts enumerated above pass snugly through holes in panel 10. With the exception of shaft 24 each of these shafts is separable longitudinally into two portions, the upper of which supports potentiometer wipers which will be described in connection with Fig. 4. The separable portions may be united by telescoping splines or in any other suitable fashion. For convenience of description both portions of each shaft are designated by the same numeral in Fig. 1 and in Figs. 2 and 3. Shaft 24, which takes no part in the automatic operation of the mechanical system, is only of sufficient length to support the potentiometer wipers associated with it, while shafts 34, 44, 54, 64 and 74 extend, when their separable portions are united, downward to end in the bevel gears presently to be described. Removing panel 10 and with it the associated potentiometers and upper shaft portions discloses the mechanical elements shown in plan in Fig. 2 and partly in elevation in Fig. 3. Fig. 3 is an elevation, as seen from the right, of the apparatus shown in Fig. 2 to the right of the line X—X.

Figure 2:
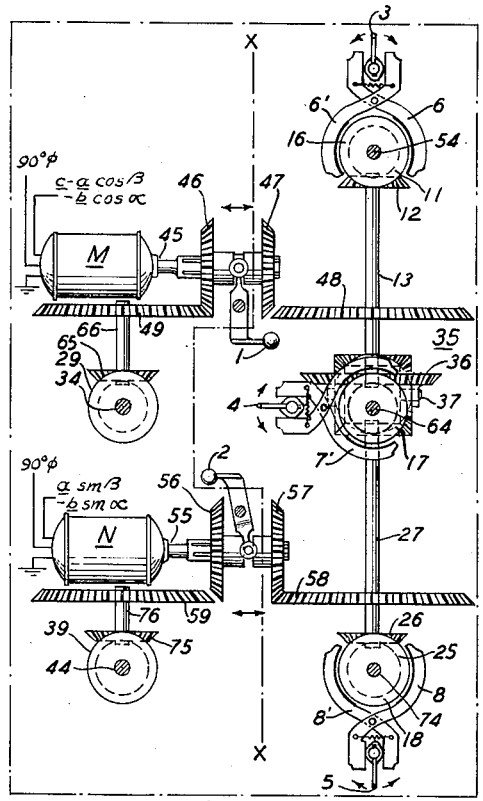
Fig. 2 is a schematic plan view of the mechanical system uncovered when the panel of Fig. 1 is removed.
Figure 3:
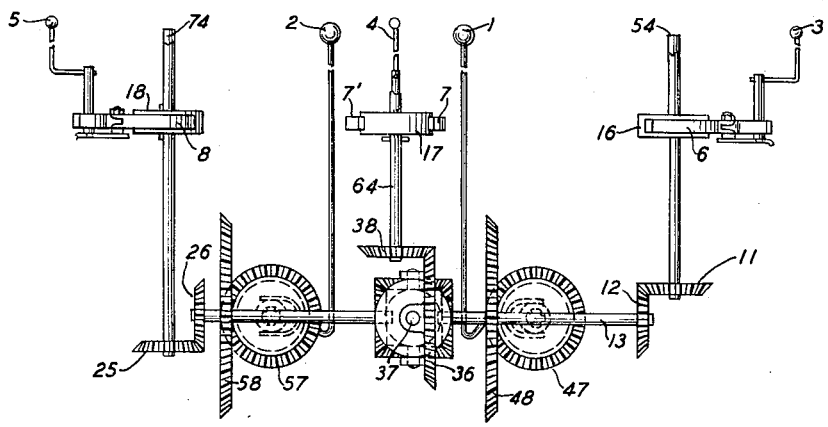
Fig. 3 is a schematic side elevation viewed from the right, of the mechanical elements shown in Fig. 2 to the right of the line X—X.

Referring to Fig. 2, shafts 54, 64 and 74 carry, at a convenient distance below the elements associated with panel 10, drums 16, 17 and 18, respectively. When lever 3 is operated either right or left jaws 6, 6' are caused to release drum 16, thereby unclamping shaft 54. Similarly, shaft 64 is clamped by centering lever 4 to cause jaws 7, 7' to seize drum 17 and shaft 74 is clamped when jaws 8, 8' are closed by centering lever 5 to seize drum 18. Shafts 24, 34 and 44 are frictionally restrained from undesired rotation.

Shaft 54 terminates in bevel gear 11, engaging bevel gear 12 on horizontal shaft 13. Shaft 74 terminates in bevel gear 25, engaging bevel gear 26 on horizontal shaft 27. Shafts 13 and 27 are joined through differential gearing 35 which serves to introduce between these shafts an angular difference controlled by the setting of ring gear 36 connected in any suitable manner to spider 37 of differential gearing 35. Shaft 64 terminates in bevel gear 38 engaging ring gear 36 and turns with pointer 61 to introduce the angular difference corresponding to the angle γ set on dial 60. Gears 11 and 12 and also gears 25 and 26 are of equal diameter but it is to be noted that the diameter of gear 38 must be one-half that of 36 in order that a rotation of shaft 64 through 20 degrees shall turn gear 36 through 10 degrees and thus, if either of shafts 13 and 27 is held fixed, turn the other of these shafts through 20 degrees. It will be clear that if shafts 54, 64 and 74 are so positioned in constructing the assembly that the angles read on dials 50, 60 and 70 together equal 180 degrees, the sum of such readings will thereafter not vary and that an arbitrary change in the setting of pointer 61 will produce an equal and opposite change in the angle read on dial 50 if shaft 74 is held fixed, or in the angle read on dial 70 if shaft 54 is restrained. Further, for any fixed setting of pointer 61 a rotation of shaft 13 is accompanied by an equal and opposite rotation of shaft 27 and conversely. Gears 11 and 25 are so mounted with respect to gears 12 and 26 that an increase in the angle α read on dial 50 accompanies a decrease in the angle β read on dial 70.

Servomotors M and N are provided to drive the various shafts the rotations of which determine the unknown elements of the triangle to be solved. Depending upon the type of problem, the required cooperation of motors M and N is selected by appropriately operating gear shift levers 1 and 2. Shaft 45 of motor M is provided with gears 46 and 47 slidable along shaft 45 by operating shift lever 1. Similarly, by the operation of shift lever 2 gears 56 and 57 may be moved along shaft 55 of motor N. Drive from motor M may be applied to shaft 13 by operating lever 1 to bring gear 47 into engagement with gear 48 mounted on shaft 13, and drive from motor N may be applied to shaft 27 by operating lever 2 to engage gear 57 with gear 58 mounted on shaft 27.

Shaft 34 carries at its lower end gear 29 permanently engaging gear 65 mounted on one end of horizontal shaft 66, the other end of which carries gear 49 adapted to be engaged by gear 46 when lever 1 is operated to the position shown in Fig. 2. Likewise shaft 44 terminates in gear 39, permanently engaging gear 75 on horizontal shaft 76, on the other end of which is mounted gear 59. By appropriately operating lever 2 gear 56 is brought into mesh with gear 59.

A voltage representing side *b* is multiplied by the sine of the angle read on dial 50, while a voltage representing side *a* is multiplied by the sine of the angle read on dial 70. If now the angles mentioned are respectively angles α and β of the triangle ABC (Fig. 6) each sine fraction voltage represents the altitude CD of that triangle. Servomotor N, driven by a voltage proportional to the difference of these sine fraction voltages, operates to vary equally and oppositely the angles read on dials 50 and 70 until the sine fraction voltages become equal and the angles α and β are thereby determined. At the same time, two other voltages are derived, one representing side *b* multiplied by the cosine of the angle read on dial 50, the other representing side *a* multiplied by the cosine of the angle read on dial 70. When these angles become respectively angles α and β of the triangle ABC, the first cosine fraction voltage is proportional to the segment AD($=b$ cos α) while the second cosine fraction voltage is proportional to the segment DB($=a$ cos β). These segments together equal side *c* of triangle ABC. The cosine fraction voltages are combined to oppose a voltage selected from a potentiometer associated with dial 30, the net resulting voltage causing servomotor M to vary the selected voltage to equality with the sine of the cosine fraction voltages, whereby side *c* is read on dial 30.

Levers 1 and 2 are operated to the positions indicated in Fig. 2 for the solution of the problem assumed, namely, a right triangle with sides *a* and *b* given. Included angle γ, in this case 90 degrees, is set on dial 60 and shaft 64 is clamped by operating lever 4. As will be explained later in describing Fig. 4, motor N is supplied with power proportional to $a$ sin β—$b$ sin α and shaft 55 rotates to turn (through gears 57 and 58) shaft 27 and therewith, in the opposite sense, shaft 13. Shafts 13 and 27 in turn control the positions of pointers 51 and 71, which when motor N comes to rest, indicate the angles α and β, respectively, on dials 50 and 70. At the same time power is supplied to motor M proportional to a voltage varied by the rotation of shaft 34 opposed by the sum of voltages representing $a$ cos β and $b$ cos α. Motor M, therefore, comes to rest when the rotation of shaft 34 has selected a voltage representing the unknown slide *c*.

ELECTRICAL SYSTEM

Figure 4:
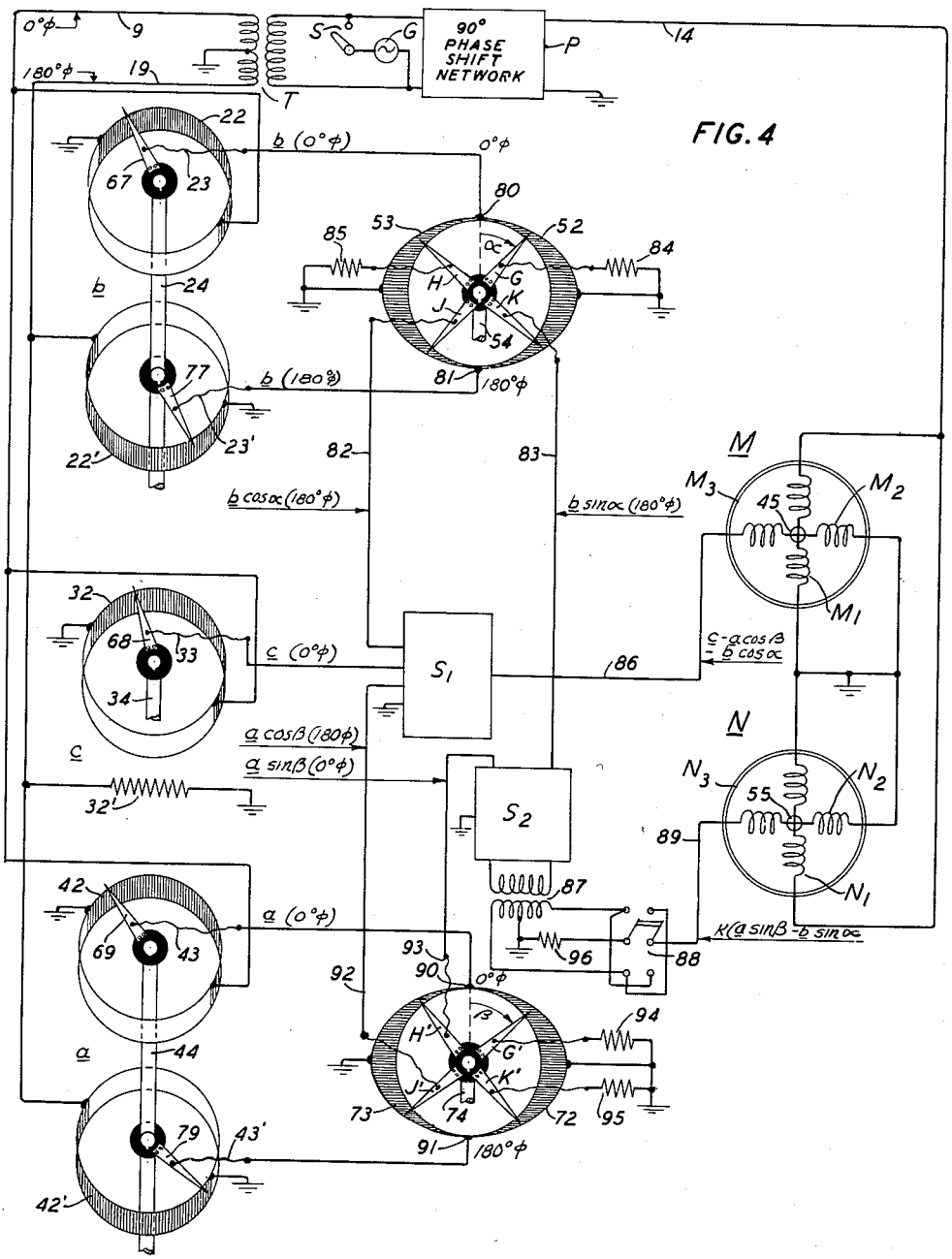
Fig. 4 is a schematic diagram of the electrical circuit of the invention.

Referring now to Fig. 4, when switch S is closed generator G furnishes an alternating voltage of any convenient frequency to two parallel circuits, namely, 90-degrees phase shift network P and the primary of transformer T, of which the secondary winding is grounded at its mid-point. Accordingly, from the secondary winding of transformer T there are obtained two equal voltages of opposite phase to ground, one between conductor 9 and ground which will be referred to as the zero-degree phase, the other between conductor 19 and ground, to be referred to as the 180-degree phase, while from network P there is obtained a voltage between conductor 14 and ground, which will be called the 90-degree phase. The 90-degree phase is supplied by conductor 14 to stator windings $M_1$ and $N_1$ of servomotors M and N.

Supported from panel 10 of Fig. 1 and centered with respect to shafts 24, 34 and 44 are similar potentiometers 22, 22', 32 and 42, 42'. One end of each of these potentiometers is grounded, while to the ungrounded ends of potentiometers 22, 32 and 42 the zero-degree phase is supplied from conductor 9 and to the ungrounded ends of potentiometers 22' and 42' the 180-degree phase is supplied from conductor 19. The resistance of potentiometer 32, supplied with zero-degree phase, is balanced by means of resistor 32' supplied with the 180-degree phase.

Shaft 24 carries wiper 67 of potentiometer 22 and wiper 77 of potentiometer 22'. These wipers are each insulated from shaft 24 but turn therewith, remaining always oppositely directed with respect to each other. In like manner wipers 69 and 79 sweep potentiometers 42 and 42', respectively, and are carried on shaft 44. A single wiper 68 is similarly carried by shaft 34 to sweep potentiometer 32.

The cards of potentiometers 22 and 22' are, conveniently, complete circular cylinders. The winding of potentiometer 22 occupies one-half of its supporting card, while that of potentiometer 22' occupies one-half of the card on which it is wound, the wound halves of these cards being displaced 180 degrees from each other. To protect the electrical system from shocks due to the introduction of wiper 67 on the winding swept by wiper 77, or conversely, potentiometers 22 and 22' are preferably supported one above the other from panel 10 concentrically on shaft 24. The supporting means, not shown, may be of any desired kind. A like description applies to the cards of potentiometers 42, 42' and the card of potentiometer 32 is also a complete circular cylinder wound correspondingly to the cards of potentiometers 22 and 42.

The windings of the potentiometers above mentioned have all the same resistance and are so tapered that despite the current drawn by the coresponding wipers the voltage between those wipers and ground is linear with the angular position of the coresponding shaft. Such tapering is disclosed, for example, in British Patent 476,-831, December 16, 1937 to Granat et al. and requires here no particular description.

The two phases of the voltage of the secondary winding of transformer T are similarly applied to similar potentiometers 22, 32 and 42 for the zero-degree phase, 22' and 42' for the 180-degree phase. Voltages selected by wipers on these potentiometers may be taken to represent distances on any desired scale. It will be understood that the positions of pointers 21, 31 and 41 exactly correspond to those of wipers 67, 68, 69, respectively, and when pointer 21 is at zero the corresponding wiper 67 is at the grounded end of potentiometer 22; similarly for pointer 31 and wiper 68 and for pointer 41 and wiper 69. Voltages of zero-degree phase to ground may, therefore, be selected by wipers 67, 68 and 69 corresponding, respectively, to sides b, c and a of the triangle to be solved while voltages of 180-degrees phase to ground are at the same time selected by wipers 77 and 79 corresponding respectively to sides b and a. There being no occasion to derive the voltage of 180-degree phase corresponding to side c, resistor 32' is used only for the sake of electrical symmetry and may be located as convenient. The voltages representing the sides are taken from the wipers concerned by conductors (which may be pigtails or, if desired, slip rings) 23, 23', 33, 43 and 43'. If we consider the zero-degree phase as positive and the 180-degree phase as negative and for brevity call the voltage between wiper 67 to ground the $b$ voltage and that between wiper 77 and ground the $-b$ voltage, etc., conductors 23, 33 and 43 take off voltages $b$, $c$ and $a$, respectively, and conductors 23' and 43' take off voltages $-b$ and $-a$, respectively. The $b$ and the $a$ voltages of both signs are to be fractionated as hereinabove stated leaving the $c$ voltage unmodified.

The fractionation of the $-b$ voltage to obtain voltages proportional to $-b \sin \alpha$ and to $-b \cos \alpha$ is accomplished by means of potentiometers 52 and 53 while voltages proportional to $a \sin \beta$ and to $-a \cos \beta$ are obtained by means of potentiometers 72 and 73. These fractionating potentiometers are understood to be supported as may be convenient from panel 10. Their cards may be horizontal as indicated in Fig. 4, or formed into vertical cylinders of which the upper boundaries are semicircles in the same plane. In either form a circular boundary is presented to be swept by wipers G, H, J and K on potentiometers 52 and 53 and by wipers G', H', J' and K' on potentiometers 72 and 73. The shape of the opposite boundary of each card is so chosen that the winding on that card shall have a resistance per turn proportional to the sine of the angle counted clockwise around the circular boundary, that is, from points 80 and 81 for potentiometers 52 and 53 and from points 90 and 91 for potentiometers 72 and 73. With such winding, the voltage between ground and wiper G, for example, is proportional to the cosine of the angle $\alpha$ in Fig. 4. Such card shapes are well known, being described, for example, in British Patent 195,616, January 30, 1924 to Schneider et Cie. The cusps of potentiometers 52 and 53 are electrically joined together at junctions 80 and 81, these junctions being also connected by conductors 23 and 23' to wipers 67 and 77, respectively. At points 90 degrees from each junction potentiometers 52 and 53 are grounded. The voltage $b$ is thus established between junction 80 and ground, the voltage $-b$ between junction 81 and ground. A like description applies to the establishment on potentiometers 72 and 73 of the $a$ voltage between junction 90 and ground and of the $-a$ voltage between junction 91 and ground. Wipers G, H, J and K turn with shaft 54, the position of wiper G in vertical alignment with pointer 51 defining the angle $\alpha$. These wipers are conductors held in fixed 90-degree relation with each other and are electrically insulated from shaft 54 and from each other. Likewise, wipers G', H', J' and K' are conductors in fixed 90-degree relation to one another supported by and turning with shaft 74 and insulated therefrom and from each other. Wiper G' in vertical alignment with pointer 71 defines the angle $\beta$.

For the purpose of this invention, it is convenient to arrange generator G to develop an alternating voltage of frequency 210 cycles per second and to derive from the secondary of transformer T 120 volts between ground and each of conductors 9 and 19. Potentiometers 22, 22', 32, 42 and 42' and resistor 32' are suitably each of resistance 20,000 ohms and the resistances between ground and junctions 80 and 81, 90 and 91 are conveniently each of that order of magnitude.

Remembering that $\alpha$ and $\beta$ defined by wipers G and G', respectively, are counted clockwise from junctions 80 and 81, junctions 90 and 91, respectively, one sees by inspection of the figure that there appear between ground and wiper J a voltage $-b \cos \alpha$ and between ground and wiper K a voltage $-b \sin \alpha$. These fractional voltages are taken from wipers J and K by conductors 82 and 83, respectively. Conductors 82 and 83 may be joined to wipers J and K by pigtails as shown or by slip rings, as desired. Inasmuch as conductors 82 and 83 each lead to a load impedance of about 250,000 ohms, 250,000-ohm balancing resistors 84 and 85 are connected by pigtails or slip rings between ground and wipers G and H, respectively. In similar fashion by conductors 43 the voltage $a$ is established between junction 90 and ground by conductor 43', the voltage $-a$ between junction 91 and ground, and voltages $-a \cos \beta$ and $a \sin \beta$ are taken off by conductors 92 and 93 from wipers J' and H', respectively. Again, the load impedances to which conductors 92 and 93 are connected are balanced by 250,000-ohm resistors 94 and 95 between ground and wipers G' and K', respectively. Voltage $c$ representing the third side of the triangle ABC is taken by conductor 33 from potentiometer 32.

Motor control amplifier $S_1$ serves to sum the voltages $c$, $-a \cos \beta$ and $-b \cos \alpha$, and motor control amplifier $S_2$ sums the voltages $a \sin \beta$, $-b \sin \alpha$. Amplifiers $S_1$ and $S_2$ will be described in connection with Fig. 5.

The output of amplifier $S_1$, namely, the voltage $c-a \cos \beta-b \cos \alpha$, is applied over conductor 86 to stator winding $M_2$ of motor M. The output of amplifier $S_2$, namely, the voltage $a \sin \beta-b \sin \alpha$, is transferred through transformer 87 over switch 88 and conductor 89 to stator winding $N_2$ of motor N. The function of switch 88 is later explained but we assume for the present that it is closed upward. It will be seen from the figure that switch 88 enables winding $N_2$ to be connected across either half of the secondary winding of transformer 87, which is grounded at its mid-point. In either position of switch 88 balancing resistor 96 is connected across the unused half of the secondary winding of transformer 87 to balance the load impedance of winding $N_2$. If switch 88 is reversed the polarity of the voltage impressed across winding $N_2$ is reversed and for a reason later to be stated the upper closure of switch 88 is to be considered normal. The voltage ratio of the windings of transformer 87 need not be unity and the voltage impressed on winding $N_2$ by conductor 89 may be written as $k(a \sin \beta-b \sin \alpha)$.

To solve the illustrative problem of case I, shift levers 1 and 2 are operated as shown in Fig. 2 to bring into engagement gears 46, 49 and 57, 58. Pointers 21 and 41 are set to read the given sides $b$ and $a$ on dials 20 and 40. Wipers 67 and 77 set with pointer 21 on shaft 24 establish voltages $b$ and $-b$ to be applied at junctions 80 and 81, while wipers 69 and 70 are set with pointer 41 to select voltages $a$ and $-a$ to be applied to junctions 90 and 91. Sine fractions of voltages $a$ and $-b$ from wipers H' and K are combined on the input of amplifier $S_2$. Cosine fractions of voltages $-a$ and $-b$ from wipers J' and J are combined with an unmodified voltage from wiper 68 on the input of amplifier $S_1$.

Windings $M_1$ and $N_1$ of motors M and N are supplied in parallel with the voltage of 90-degrees phase from conductor 14 and the currents thereby caused to flow in these windings are constant. Rotors $M_3$ and $N_3$ are understood to be fixed on shafts 45 and 55, respectively, and each experiences a torque when current flows in winding $M_2$ or $N_2$ in quadrature with the steady current in windings $M_1$ and $N_1$. Such a quadrature current flows in winding $N_2$ when the sine fraction voltages summed by amplifier $S_2$ do not cancel each other and rotor $N_3$ turns shaft 55 and therewith through gears shafts 54 and 74 until the net input voltage of amplifier $S_2$ vanishes. Shafts 54 and 74 turn in opposite senses and motor N comes to rest when the sine fractions of voltages $a$ and $-b$ are equal in magnitude, whereupon pointer 51 on shaft 54 reads the angle $\alpha$, and pointer 71 on shaft 74 reads the angle $\beta$.

This rest position of motor N determines the cosine fraction voltages $-a \cos \beta$ and $-b \cos \alpha$ and if these fractions together do not equal in magnitude the voltage derived from wiper 68 a net voltage will appear in the output of amplifier $S_1$ and produce in winding $M_2$ of motor M a current in quadrature with that due to the voltage derived from conductor 14. Rotor $M_3$ then will turn shaft 34, coming to rest when the voltage taken from wiper 68 becomes that representative of side $c$. When the solution of the illustrative problem is complete angles $\alpha$ and $\beta$ are read on dials 50 and 70, respectively, and side $c$ on dial 30. Mathematically expressed motors M and N have cooperated to solve for $\alpha$, $\beta$ and $c$ and the three simultaneous equations $$\alpha+\beta=180°-\gamma$$
$$a \sin \beta-b \sin \alpha=0$$
$$c-a \cos \beta-b \cos \alpha=0$$

where $a$, $b$ and $\gamma$ are given. There is obviously no limitation on the value of $\gamma$, 90 degrees having been selected solely for illustration.

Before proceeding to describe the use of the invention in solving triangles for which the given data are other than those illustrated, it is desirable to explain the control of motors M and N by amplifiers $S_1$ and $S_2$. These amplifiers comprise each a three-stage summing amplifier followed by a power stage. The latter is conventional and is not herein described. Each summing amplifier is designed to receive on its input circuit the appropriate voltages derived from the potentiometer of Fig. 4 and to provide on its output circuit a voltage which vanishes with the vanishing of the net input voltage. The schematic circuit of the summing stages of amplifier $S_1$ is shown in Fig. 5.

Referring to Fig. 5, a plurality of voltages may be applied individually through input resistors 97, 98 and 99 to the control grid of vacuum tube 100. This tube and succeeding vacuum tubes 101, 102 are appropriately pentodes since high gain is desirable in the first and second stages. It will be seen from the diagram of Fig. 5 that for each of tubes 100, 101 the cathode is connected to the suppressor grid while tube 102 is used as a triode, screen and suppressor grids being connected to the anode. The anode of tube 100 is coupled through condenser 103 to the control grid of tube 101 of which the anode is coupled through condenser 104 to the control grid of tube 102. Grid leaks 105 and 106 individually connect to ground the control grids of tubes 101 and 102 and each of these grid leaks is shunted by a network consisting of resistor 107 in series with condenser 108 for grid leak 105, resistor 109 in series with condenser 110 for grid leak 106. Anode power from battery 111 is supplied through resistors 112, 113 and 114 to tubes 100, 101 and 102, respectively. The screen grid voltage for tubes 100 and 101 is derived from battery 111 by way of voltage dividers 115, 116 and 117, 118, respectively. The cathode of each vacuum tube is indirectly heated by the usual means, not shown.

The following values have been found suitable for the circuit elements so far enumerated. The voltage of battery 111 is 210 volts, supplies through 250,000-ohm resistors 112 and 113 to the anodes of tubes 100 and 101 and through 20,000-ohm resistor 114 to the anode of tube 102. 250,000-ohm resistors 115 and 117 with 30,000-ohm resistors 116 and 118 enable a voltage of 22.5 volts to be supplied to the screen grids of tubes 100 and 101. The output of tube 102 is made available to an ensuing push-pull power stage, not shown in Fig. 5, through transformer 119 of which the primary winding is connected in shunt with resistor 114, the secondary winding being grounded at its mid-point. Terminals 120 and 121 of the secondary winding of transformer 119 lead to the control grids of the push-pull power tubes which are understood to deliver power controlled by the circuit of Fig. 5 to stator winding $M_2$ of motor M. Resistors 97, 98 and 99 are each of 250,000-ohms resistance.

Tubes 100, 101 and 102 are suitably each a 6SJ7 and transformer 119 is appropriately chosen to connect the output circuit of tube 102 to the input circuit of the push-pull power stage of which the circuit is conventional, suitably using 6L6 vacuum tubes.

The description of the circuit of Fig. 5 is completed by enumerating cathode resistors 122, 123 and 124 and feedback path FF' between the mid-points of resistors 122 and 124 in the cathode circuits of tubes 100 and 102, respectively. Resistors 122 and 124 are each of 1,500-ohms resistance, centrally tapped for the feedback connection, while the resistance of biasing resistor 123 is 900 ohms.

The circuit of amplifier $S_2$ is the same as that described for amplifier $S_1$ except that input resistor 99 is not required. Each amplifier is called upon to control a voltage delivered to a power stage furnishing power to operate a servomotor, in such a way that the controlled voltage is a function of the algebraic sum of the voltages individually applied to the input resistors and vanishing when this sum is zero. The input voltages are all of the same frequency and vary in amplitude with comparative slowness so that the resulting side-bands are narrow.

The voltages separately applied to the input resistors 97, 98 and 99 produce currents in the input circuit of tube 100 which combine to provide between ground and the control grid of that tube a voltage varying with the sum of the separately applied voltages. The resultant voltage is not strictly linear with the sum of the input voltages by reason of the mutual interactions among them, arising from the high input impedance of tube 100 but the resultant voltage becomes zero when the input voltages cancel each other. Amplifier $S_1$ receives input voltages $c$, $-a \cos \beta$ and $-b \cos \alpha$. The resultant grid-to-ground voltage of tube 100 is amplified and applied to a power stage wherefrom power is delivered to winding $M_2$ of motor M. Rotor $M_3$ thereupon turns in a direction determined by the sign of the quadrature relation of this power to that of the 90-degree phase power in winding $M_1$ supplied from network P of Fig. 4. In assembling the system this relation is made such that for a positive value of $c - a \cos \beta - b \cos \alpha$, rotor $M_3$ will turn shaft 45 and when gear 46 engages gear 49 shaft 34 will alter the reading at dial 30 until the net voltage input of amplifier $S_1$ becomes zero.

The above account assumes that amplifier $S_2$ with input voltages derived as sine fractions of $a$ and of $-b$ has caused the power delivered to winding $N_2$ of motor N to produce rotation of shaft 55 until (gears 57 and 58 being meshed) shafts 74 and 54 are oppositely rotated until the net voltage applied to the input of $S_2$ becomes zero. By this rotation angles $\alpha$ and $\beta$ are determined and $a \sin \beta - b \sin \alpha = 0$.

The use of high gain tubes together with a high value of negative feedback in the path FF' provides the necessary stability and reduces to a convenient value the effective grid-to-ground impedance of tube 100. Feedback resistor 125 of 20,000-ohms resistance is connected between the mid-point of resistor 122 and that of resistor 124. The resulting feedback is such that despite the high gain vacuum tubes used the over-all input-output voltage ratio of the circuit of Fig. 5 is approximately unity at the frequency supplied to the system. Resistor 125 is shunted by two resonant circuits, the first comprising inductance 126 in series with condenser 127 tuned conveniently to 210 cycles per second; the second, comprising inductance 128 in parallel with condenser 126, is also tuned to 210 cycles per second, the frequency of the voltage from generator G. The network comprising feedback resistor 125 and its associated tuned circuits is substantially disclosed in United States Patent 2,208,623, July 23, 1940 to D. S. Bond. The tuned circuit shunting resistor 125, together with the resistance capacity networks shunting grid leaks 105 and 106, serves to cause the over-all transmission of the circuit of Fig. 5 to be a minimum at the carrier frequency, in this case 210 cycles per second, and to increase 6 decibels per octave as the frequency applied to the input circuit of tube 100 departs in either direction from the carrier, a requirement that must be fulfilled if the system is to be stable.

The voltages supplied to resistors 97, 98 and 99 are of the same frequency but separately vary in amplitude at comparatively slow rates and the side-band frequencies resulting from this variation lie close to the carrier. Moreover, while the interaction between the voltages on the separate input resistors prevents the 210-cycle output voltage of tube 102 from being at all times proportional to the sum of the input voltages, this output voltage vanishes when the input voltage sum is zero and motors M and N come to rest when $c - a \cos \beta - b \cos \alpha = 0$ and $a \sin \beta - b \sin \alpha = 0$. The summing amplifiers which to this end control the powers delivered to motors M and N are in themselves no part of the present invention and the mathematical analysis of their operation is here unnecessary.

The servomotors so controlled by amplifiers $S_1$ and $S_2$ operate to vary one or more of the input voltages supplied to the controlling amplifier. In each case the whole system of voltage sources, controlling amplifier and motor is actually a closed loop and the design principles of feedback amplifiers are applicable. These principles are fully explained in United States Patent 2,123,178, July 12, 1938 to H. W. Bode.

Here it may be pointed out that the specific apparatus components described above may individually be replaced by equivalents performing the same functions. Continuous voltages instead of alternating may be used. The resistance potentiometers described may be replaced by capacitors having plates appropriately shaped as known to the art. Multiple wound relays may replace amplifiers $S_1$ and $S_2$ and may serve to control the supply of power to induction motors or to direct current motors taking the place of servomotors M and N. It is therefore clear that in the apparatus of Figs. 1 to 4 many substitutions of equivalents may be made without ceasing to use the invention herein disclosed.

The problem of solving a triangle of which two sides and one angle are given has been discussed where the given angle is that included between the given sides. Suppose that the given angle is adjacent one of the given sides and opposite the other. It is convenient then to set the given angle on dial 50 and set on dial 20 the given side to which this angle is adjacent. On dial 40 is set the other given side. Levers 1 and 2 are set in the positions shown in Fig. 2 whereby shaft 55 controls shaft 27 and therewith shaft 74 to find on dial 70 the angle opposite the given adjacent side, while shaft 45 controls shaft 34. From the foregoing description of the functioning of the apparatus, it will be clear that now motor M will operate to find on dial 30 the unknown third side. As motor N operates to determine on dial 70 the angle opposite the side set on dial 20, shaft 13 being held fast by the clamping of shaft 54, ring gear 36 will turn to rotate pointer 61 to read the angle opposite the third side. The solution, however, is not unique unless one of the unknown angles is a right angle.

Referring to Fig. 6, let sides $a$ and $b$ and the angle $\alpha$ be given in the triangle ABC. When $\alpha < 90$ degrees, there will be no solution if $a < b \sin \alpha$ but for $a > b \sin \alpha$ two solutions are possible. Voltage $b \sin \alpha$ is opposed on the rotor winding of motor N by the voltage $a \sin \beta$ and $\beta$ may be replaced by its supplement $\beta'$. In the diagram of Fig. 6, triangles ABC or AB'C will not be distinguished by the apparatus of the invention unless we introduce an element additional to those already provided. This additional element is switch 88, whereby the phase of the net voltage $a \sin \beta - b \sin \alpha$ may be reversed to reverse the rotation of servomotor N.

Suppose that on setting into the apparatus the data given, namely $b$ on dial 20, $a$ on dial 40, $\alpha$ on dial 50, the position of wiper G' and pointer 71 corresponds to angle $\beta''>$ the angle $\beta$ of the actual triangle. In this case, the voltage $a \sin \beta''$ will be greater than the opposing voltage $b \sin \alpha$ and we select a switch position to apply the net voltage in such phase on the rotor winding of motor N as to turn shaft 74 to reduce the reading $\beta''$ thus finding the angle $\beta$ and the solution ABC. The position of switch 88 which accomplishes this we shall call position 1. The reversal of the switch to position 2 finds the solution AB'C.

In any practical case, we know which solution is appropriate. Switch position 1 will be chosen as the normal position for a reason that appears on consideration of the diagram of Fig. 7 where $\alpha$ is greater than 90 degrees. The voltage $b \sin \alpha$ is unchanged if we replace $\alpha$ by its supplement, that is, balanced by the voltage $a \sin \beta'$ where $\beta'$ now equals $\beta$ but the corresponding triangle AB'C in the diagram of Fig. 7 is known not to be the one desired since it contains the angle 180 degrees $-\alpha$ instead of $\alpha$. In this situation, the desired switch position is again that which effects a decrease in $\beta''$ read on dial 14 to $\beta$ corresponding to the correct triangle ABC. It is, therefore, proper to call switch position 1 the normal position, and we so connect the primary of transformer 87 that this is the upward closing of switch 88.

The solution of problems of case II, given one side and two angles, is obtained by shifting lever 2 to bring gear 56 into engagement with gear 59 disengaging gears 57 and 58. Lever 1 remains as shown in Fig. 2 and gears 46, 49 are in mesh. All angles are in fact known and it is appropriate to set on dial 20 the value of the given side while the angle opposite thereto is set on dial 70. The other angles are set by moving either dial 50 or dial 60.

In this case, shaft 34 is to be controlled by motor M and shaft 44 will be controlled by motor N. The positions of shafts 18, 27 and ring gear 36 are established by the settings on dials 50, 60 and 70 and are not affected by the rotations of motors M and N.

A little consideration will show that wiper K will provide a 180-degree phase voltage representing the known side multiplied by the sine of the angle set on dial 50 which sine fraction voltage will be opposed (at amplifier $S_2$) by a sine fraction voltage derived by wiper H'. This opposing fractional voltage will equal in magnitude the product of the sine of the angle opposite the known side and a voltage selected by wiper 69 on potentiometer 42. Inequality of the opposing voltages will produce rotation of shaft 55 of motor N and so of shaft 44. The rotation ceases when wipers 69, 79 have provided voltages representative of the side opposite the angle set on dial 50. Two sides and their respective opposite angles are thus obtained and the cosine fraction voltages provided from wipers J and J', respectively, are simultaneously combined at amplifier $S_1$ to cause motor M to rotate shaft 45 and therewith shaft 34. Wiper 68 takes a position providing a voltage representative of the third side to balance the sum of the cosine fraction voltages on the rotor winding of motor M. It is to be borne in mind that in every case the angle read on dial 70 is that opposite the side read on dial 20, the angle read on dial 50 is that opposite the side read on dial 40 and the angle read on dial 60 is that opposite the side read on dial 30.

As an example of a problem of case II, assume given the side $b$ and the angles $\alpha$ and $\gamma$. Set $b$ on dial 20, $\gamma$ on dial 60, $\alpha$ on dial 50. This fixes $\beta$ on dial 70. Lever 2 is thrown to effect the engagement of gears 56 and 59 while gears 46, 49 are left in mesh. The rotor winding of motor N receives from wiper K a voltage proportional to $b \sin \alpha$ and from wiper H' an opposing voltage proportional to the product of $\sin \beta$ and a voltage derived by wiper 69. Simultaneously, the rotor winding of motor M receives a voltage proportional to $b \cos \alpha$ which is added to a voltage proportional to the product of $\cos \beta$ by the voltage derived from wiper 69 and this sum is opposed to a voltage derived by wiper 68. The operation of motor M moves wiper 68 to derive a voltage proportional to the side $c$. Before this movement of wiper 68 the net voltage supplied the motor M might have been zero but as motor N is set in motion, motor M follows it. Both motors come to rest when side $c$ is read on dial 30 and the sum of cosine fraction voltages $b \cos \alpha$ and $a \cos \beta$ are balanced on the rotor winding of motor 43 by a voltage representative of side $c$ derived by wiper 68.

When the problem for solution is one of case III, lever 2 is set as shown in Fig. 2, while lever 1 is operated to engage gears 47 and 48. In such a problem, the simultaneous equations are solved as in the case already stated, except that now $a$, $b$, $c$ are given and motors M and N cooperate to control shafts 13 and 27 simultaneously. The servomotors come both to rest when their rotations have provided solutions of the equations $$a \sin \beta - b \sin \alpha = 0$$
$$c - a \cos \beta - b \cos \alpha = 0$$

This solution determines $\alpha$ and $\beta$ and ring gear 36 accommodates itself thereto whereby $\gamma$ is indicated by pointer 61 on dial 60. Voltages proportional to $a$, $b$, $c$ are established by setting the appropriate dials the three sides $a$, $b$ and $c$.

A detailed consideration of other possible combinations of given elements of the triangle to be solved leads to the following instructions:

Case I, given two sides and one angle

Operate levers 1 and 2 to the right and to the left, respectively. If the given angle is included by the given sides, set it on dial 60, and set the given sides on dials 20 and 40. If the given angle is adjacent one of the given sides, set the angle on dial 50, the adjacent given side on dial 20 and the other given side on dial 40. Motors M and N now cooperate to determine by motor M the unknown side and by motor N the unknown angles, reading on dial 50 the angle opposite the side on dial 40, on dial 70 the angle opposite the side on dial 20, on dial 60 the angle opposite the side on dial 30.

Case II, given one side and two angles

Operate to the right both levers 1 and 2. Set the given side on dial 20 and the angle opposite this side on dial 70, the other angles being set as convenient on dials 50 and 60. Motors M and N now cooperate to determine each one of the unknown sides on dials which correspond as in case I to the angle dials.

Case III, three sides given

Operate to the left both levers 1 and 2 and set the gun sides as convenient on dials 20, 30 and 40. Motors M and N now cooperate to determine the three angles on dials 50, 60 and 70 corresponding as in the previous cases to the distance dials.

In all three cases, two opposing sine fractions of voltages representing sides are equated by motor N and the corresponding cosine fraction voltages are together equated by motor M to an unmodified voltage representing a third side. The manner of cooperation of motors M and N is selected by manipulation of levers 1 and 2.

The foregoing description has included no mention of the accuracy to be expected from the invention. This is fixed of course by the precision of construction of the parts, and it is entirely practicable without going to excessive dimensions to reduce the error to below one-tenth of one percent in distance and one-tenth of a degree in angle. Such accuracy is sufficient for all purposes where the invention replaces logarithmic computation, and is in particular adequate for the problem of gun-fire control.

It is obviously a simple matter to apply the present invention to the control of a distant gun, as earlier mentioned. For this purpose a sighting telescope with range finder will be mounted on shaft 64, and the bearing of the target with respect to the gun will be read at the observer's position on dial 60. At the same time the distance dial of the range finder will be coupled by any known means to shaft 44, whereby one side of the triangle, namely the distance from observer to target, will be set on dial 40. The known distance from gun emplacement to the observer is set on dial 20. Applying now to the computer the voltage from generator G, the observer obtains on dial 30 the range from gun to target and the motion of shaft 34 may be telemetrically transmitted to control the range sight of the gun. The bearing of the target with respect to the observer from the gun position will be the angle read on dial 50, and the motion of shaft 54 may be telemetrically transmitted to control the training of the gun. If gun, target and observer are all in the same horizontal plane, the range from gun to target (side $c$ of the triangle) determines the elevation of the gun and this, as well as the range, may be telemetrically controlled by the information transmitted from dial 30. In such circumstances, the control of the gun is directed wholly automatically from the observer's position.

What is claimed is:

1. An electromechanical computer for the solution of a plane triangle comprising a source of voltage, a first, a second, and a third potentiometric means for deriving from said source a first, a second, and a third voltage representative respectively of the lengths of a first, a second, and a third side of said triangle, a fourth potentiometric means for deriving from said first voltage a first sine voltage and a first cosine voltage respectively proportional to the length of said first side multiplied by the sine and by the cosine of a first angle, a fifth potentiometric means for deriving from said third voltage a second sine voltage and a second cosine voltage respectively proportional to the length of said third side multiplied by the sine and by the cosine of a second angle, a first, a second, a third, a fourth and a fifth shaft controlling respectively said first, second, third, fourth, and fifth potentiometric means, means for introducing a desired angular phase difference between said fourth and said fifth shafts, gearing associated with said second, third, fourth, and fifth shafts, electrical means for summing in phase opposition said sine voltages, a first voltage responsive device, means for applying to said first device the sum of said sine voltages in phase opposition, electrical means for summing said cosine voltages in phase opposition to said second voltage, a second voltage responsive device, means for applying to said second device the sum of said cosine voltages opposed to said second voltage, gearing associated with each of said devices adapted for variable engagement with the gearing associated with said second, third, fourth and fifth shafts and means for varying said engagement.

2. In a computer for the solution of a plane triangle, an electrical circuit comprising a source of voltage, means for deriving from said source a first, a second, and a third voltage respectively representative of the lengths of a first, a second and a third side of said triangle, a first potentiometric means for deriving from said first voltage a sine fraction voltage and a cosine fraction voltage respectively representative of the length of said first side multiplied by the sine and by the cosine of the angle of said triangle opposite said second side, a second potentiometric means for deriving from said second voltage a sine fraction voltage and a cosine fraction voltage respectively representative of said second side multiplied by the sine and by the cosine of the angle of said triangle opposite said first side, a first and a second amplifier having each an input circuit and an output circuit, means for combining in the input circuit of said first amplifier said sine fraction voltages in phase opposition, means for combining in the input circuit of said second amplifier said cosine fraction voltages simultaneously in phase opposition to said third voltage, a first motor supplied with electrical power from the output circuit of said first amplifier and a second motor supplied with electrical power from the output circuit of said second amplifier.

3. In a computer for the solution of a plane triangle an electrical circuit as in claim 2 including switching means in the output of said first amplifier whereby the power supplied to said first motor may be reversed.

4. Means for automatically solving a plane triangle comprising a source of voltage, a first electrical means for deriving from said source three voltages individually representing the sides of said triangle, a second electrical means for deriving from one of said voltages a sine fraction voltage and a cosine fraction voltage proportional respectively to the sine and the cosine of the angle of said triangle opposite the side thereof represented by a second of said voltages, a third electrical means for deriving from said second voltage a sine fraction voltage and a cosine fraction voltage proportional respectively to the sine and cosine of the angle of said triangle opposite the side thereof represented by said one voltage, a fourth electrical means for deriving a first difference voltage proportional to the difference of said sine fractional voltages, a first electrical motor, means for applying said first difference voltage to said first motor, a fifth electrical means for deriving a second difference voltage proportional to the difference between the third of said voltages and the sum of said cosine fraction voltages, a second electrical motor, means for applying to second motor said second difference voltage, mechanical means for controlling simultaneously said second and third voltage deriving means, gearing for controlling said mechanical means and capable of selective cooperation with said motors, and manually operable means for selecting said cooperation.

5. Means for the automatic solution of a plane triangle of which three elements are given, at least one of said elements being the length of a side of said triangle, comprising a source of voltage, electrical means for deriving from said source three voltages capable of being varied to represent individually the lengths of the sides of said triangle, indicating means individually indicating the lengths represented by said voltages, mechanical means for varying said voltages, means for establishing three angles of which the sum is invariably 180°, means for deriving from one of said voltages a sine fraction voltage and a cosine fraction voltage proportional respectively to the sine and the cosine of one of said angles, means for deriving from a second of said voltages a second sine fraction voltage and a second cosine fraction voltage proportional respectively to the sine and the cosine of another of said angles, means for deriving a first difference voltage proportional to the difference of said sine fraction voltages, means for deriving a second difference voltage proportional to the difference between a third of said voltages and the sum of said cosine fraction voltages, a first electrical motor, a second electrical motor, means for applying said first difference voltage to said first motor, means for applying said second difference voltage to said second motor, and means selectively connecting said motors with said voltage varying means and said angle establishing means.

6. In a computing device, means for automatically solving a plane triangle of which are given the lengths of two sides and the angle included therebetween, including a source of voltage, means for deriving from said source voltages individually representing the lengths of said given sides, indicating means individually indicating the lengths represented by said voltages, means for deriving from the first of said voltages a sine fraction voltage and a cosine fraction voltage proportional respectively to the sine and the cosine of a first angle, means for deriving from the second of said voltages a second sine fraction voltage and a second cosine fraction voltage proportional respectively to the sine and the cosine of a second angle, indicating means individually indicating the values of said angles, a first shaft controlling the value of said first angle, a second shaft controlling the value of said second angle, adjustable differential gearing between said shafts insuring that said second angle should equal the difference between said first angle and 180° diminished by said given angle, means for deriving a first difference voltage proportional to the difference of said sine fraction voltages, means for deriving from said source a third voltage, means for indicating a length represented by said third voltage, means for deriving a second difference voltage proportional to the difference between said third voltage and the sum of said cosine fraction voltages, a third shaft controlling said third voltage deriving means, a first motor controlling said second shaft and therewith through said differential gearing controlling said first shaft oppositely to said second shaft, means for applying to said first motor said first difference voltage thereby to cause rotation of said first and second shafts in opposition to effect equality of said sine fraction voltages whereby said first angle is determined as the angle of said triangle opposite one of said given sides and said second angle is determined as the angle opposite the other given side, a second motor controlling said third shaft, means for applying said second difference voltage to said second motor to effect equality of said third voltage with the sum of said cosine fraction voltages, whereby said third voltage is adjusted to represent the length of said third side of said triangle.

7. In a computing device, means for the solution of a plane triangle including means for representing the lengths of the sides of said triangle individually by three electrical voltages, means for deriving from one of said voltages a sine fraction voltage and a cosine fraction voltage proportional respectively to the sine and the cosine of a first angle, means for deriving from a second of said voltages a sine fraction voltage and a cosine fraction voltage proportional respectively to the sine and the cosine of a second angle, mechanical means for establishing said angles, means for oppositely and equally varying said angles, electrical means for deriving a first control voltage proportional to the difference of said sine fraction voltages, a first motor adapted to be controlled by said first control voltage, electrical means for deriving a second control voltage proportional to the difference between the third of said voltages and the sum of said cosine fraction voltages, a second motor adapted to be controlled by the second control voltage and gearing effecting the cooperation of said motors in controlling said mechanical means.

8. In a computer for the automatic solution of a plane triangle of which are given the lengths of two sides and the angle opposite one of said sides, means for determining the unknown angles of said triangle including a source of voltage, means for deriving from said source a first voltage representing the length of the one of said sides opposite said given angle, and a second voltage representing the length of the other of said sides, means for deriving from said second voltage a sine fraction voltage proportional to the sine of said given angle, means for deriving from said first voltage a sine fraction voltage proportional to the sine of a variable angle, and means for varying said variable angle to effect the equality of said sine fraction voltages whereby said variable angle becomes the angle of said triangle opposite said other side and the third angle of said triangle is determined as 180° diminished by the sum of said given angle and the angle opposite said other side.

9. Means as in claim 8 for determining the unknown angles of a plane triangle of which are given the lengths of two sides of said triangles and the angle thereof opposite one of said sides, wherein said angle varying means includes a servomotor controlled by a voltage proportional to the difference of said sine fraction voltages.

10. Means as in claim 8 for determining the unknown angles of a plane triangle of which are given the lengths of two sides of said triangle and the angle thereof opposite one of said sides wherein said angle varying means includes a servomotor controlled by a voltage proportional to the difference of said sine fraction voltages, and switching means adapted to reverse the phase of said proportional voltage.

11. A computer for the solution of a plane triangle comprising means for indicating the lengths of the sides of said triangle, means for indicating the angles of said triangle, a first pair of shafts connected with said first-named means, three primary shafts connected individually with said second-named means, a pair of secondary shafts including a differential gear connecting said primary shafts whereby the sum of the angles indicated by said second-named means is invariably 180 degrees, a first driving means selectively operable to control alternatively one shaft of said first pair or one of said secondary shafts, a second driving means selectively operable to control alternatively the other shaft of said first pair or the other of said secondary shafts, interdependent power supplies for said driving means, means for selecting the shaft controlled by said first driving means and means for selecting the shaft controlled by said second driving means.

12. In a computer for solving a plane triangle of which are known three elements at least one of said elements being the length of a side of said triangle, means for determining the unknown elements of said triangle including three distance indicators by the first of which is indicated the length of said known side, three angle indicators, a pair of shafts individually connected with the second and the third of said distance indicators and provided individually with gears, a group of three shafts individually connected with said angle indicators and provided individually with gears, a pair of secondary shafts provided with gears engaging individually the gears of the first and of the third shafts of said group, a differential gear uniting said secondary shafts and engaging the gear of the second shaft of said group whereby the sum of the angles indicated by said angle indicators is made invariably 180 degrees, means for selectively clamping the shafts of said group, a first driving means selectively operable to control alternatively the first shaft of said pair or one of said secondary shafts, a second driving means selectively operable to control alternatively the second shaft of said pair or the other of said secondary shafts, interdependent power supplies for said driving means, and means individual to said driving means for selecting the shafts to be controlled thereby.

13. In a computer for solving a plane triangular of which are known the lengths of two sides and the angle included between said sides, means for determining the unknown elements of said triangle including three distance indicators by the first and the third of which are indicated the lengths of the first and the second of said known sides, respectively, three angle indicators by the second of which is indicated said included angle, a shaft controlling the second of said distance indicators and provided with gears, a group of three shafts individually controlling said angle indicators and provided individually with gears, a pair of secondary shafts provided with gears engaging individually the gears of the first and the third shafts of said group, a differential gear uniting said secondary shafts and engaging the gear of the second shaft of said group whereby the sum of the angles indicated by said angle indicators is made invariably 180 degrees, means for clamping said second shaft, a first driving means controlling said first-named shaft to indicate on the second of said distance indicators the length of the unknown side of said triangle, a second driving means controlling directly one of said secondary shafts to indicate by the third of said angle indicators the angle of said triangle opposite the side indicated by said first distance indicator and simultaneously oppositely controlling through said differential gear the other of said secondary shafts to indicate by the first of said angle indicators the angle opposite the side indicated by said third distance indicator, and interdependent power supplies for said driving means.

14. In a computer for solving a triangle of which are known the lengths of two sides and the angle opposite one of said sides, means for determining the unknown elements of said triangle including three distance indicators by the first and third of which are indicated the lengths of the first and second of said known sides respectively, three angle indicators by the first of which is indicated the angle of said triangle opposite the side thereof indicated by said third distance indicator, a shaft controlling the second of said distance indicators, a group of three shafts individually controlling said angle indicators and provided individually with gears, means for clamping the shaft of said group controlling said first angle indicator, a pair of secondary shafts provided with gears engaging individually the gears of the first and the third shaft of said group, a differential gear uniting said secondary shafts and engaging the gear of the second shaft of said group whereby the sum of the angles indicated by said angle indicators is made invariably 180 degrees, a first driving means controlling said first named shaft whereby said second distance indicator is controlled to indicate the length of the third side of said triangle, a second driving means controlling one of said secondary shafts and thereby directly the third shaft of said group and through said differential gear the second shaft of said group whereby are indicated on said third angle indicator the angle of said triangle opposite the side indicated on said first distance indicator and on the second of said angle indiactors the third angle of said triangle, and interdependent power supplies for said driving means.

15. In a computer for the solution of a plane triangle of which the lengths of the three sides are known, means for determining the angles of said triangle including a first group of three distance indicators on which are indicated individually the lengths of said sides, a second group of three angle indicators, three primary shafts controlling individually said angle indicators, a pair of secondary shafts including a differential gear positioning said primary shafts in such manner that the sum of the angles indicated by said angle indicators is invariably 180 degrees, a first driving means controlling one of said secondary shafts, a second driving means controlling the other of said secondary shafts, and interdependent power supplies to said driving means whereby said driving means are caused cooperatively to control through said secondary shafts the first and third of said primary shafts directly and the second of said primary shafts through said differential gear thereby to indicate by the first and third of said angle indicators the angles of said triangle respectively opposite the sides indicated by the third and the first of said distance indicators and by the second of said angle indicators the angle of said triangles opposite the side thereof indicated by the second of said distance indicators.

16. A computer for the solution of a plane triangle comprising a first, a second and a third means for indicating individually the length of the sides of said triangle, a first, a second and a third means for indicating individually the angles of said triangle, means including a differential gear whereby the sum of the angles indicated by said angle indicating means is made invariably 180 degrees, a first driving means selectively operable to control alternatively one of said length indicating means or one of said angle indicating means, a second driving means selectively operable to control alternatively another of said length indicating means or another of said angle indicating means, means individual to said driving means to select indicating means thereby to be controlled and interdependent power supplies for said driving means.

17. In a device for the solution of a plane triangle, means for representing the lengths of the sides of said triangle including a first group of three shafts, two of the shafts of said first group being individually connected through gears with a first and a second transverse gear, respectively, means for representing the angles of said triangle including a second group of three shafts, the first and the third shaft of said second group being individually connected through gears with a third and a fourth gear, respectively, a mechanical connection including a differential gear between said third and said fourth gears and means including gears for connecting the second shaft of said second group with said differential gear.

18. In a device for the solution of a plane triangle, means for representing the lengths of the sides of said triangle including a first group of three shafts, two of the shafts of said first group being individually connected through gears with a first and a second gear, respectively, means for representing the angles of said triangle including a second group of three shafts, the first and the third shaft of said second group being individually connected through gears with a third and a fourth gear, respectively, a mechanical connection including a differential gear between said third and said fourth gears, a first motor provided with a shaft having gearing adapted to engage alternatively said first or said third gear and a second motor provided with a shaft having gearing adapted to engage alternatively said second or said fourth gear.

19. In a computing device for the solution of a plane triangle of which are given three elements, at least one of said elements being the length of a side of said triangle, means for determining the unknown elements of said triangle including a first, a second, and a third distance dial, a first, a second, and a third angle dial, shafts individual to said dials and rotatably mounted concentrically therewith, pointers individually rotated with said shafts whereby are indicated distances on said distance dials and angles on said angle dials, a first gearing including a differential gear so connecting the shafts concentric with said angle dials that the sum of the angles indicated on said angle dials is made 180 degrees, clamping means individual to the shafts concentric with said angle dials, a second and a third gearing mounted individually on the shafts concentric with said second and said third distance dials, respectively, a first motor provided with a shaft having a gear capable of engaging alternatively said first or said second gearing, the said second motor provided with a shaft having a gear capable of engaging alternatively said first or said third gearing, and gear shift means whereby the engagements of said gearings are determined.

20. In a computing device for the solution of a plane triangle, means including a first, a second, and a third vertical shaft for indicating the lengths of the sides of said triangle, means including a fourth, a fifth, and a sixth vertical shaft for indicating the angles of said triangle, a first pair of gears connecting said fourth vertical shaft with a first horizontal shaft, a second pair of gears connecting said sixth vertical shaft with a second horizontal shaft, a differential gearing connecting said horizontal shafts, a third pair of gears connecting said differential gear with said fifth vertical shaft in such manner that rotation of said fifth shaft introduces between said horizontal shafts an angular phase difference equal to the angle of rotation of said fifth shaft, clamping means individual to said fourth, fifth and sixth vertical shafts, a first transverse gear positioned on said first horizontal shaft, a second transverse gear positioned on said second horizontal shaft, a third transverse gear positioned on said second vertical shaft, a fourth transverse gear positioned on said third vertical shaft, a first motor provided with gearing capable of meshing alternatively with said first or with said third transverse gear, a second motor provided with gearing capable of meshing alternatively with said second or with said fourth transverse gear, manually operable means for selecting the meshing of the gearing of said first motor and manually operable means for selecting the meshing of the gearing of said second motor.

21. For the solution of a plane triangle of which three elements are known, at least one of the known elements being the length of a side of the triangle, a system of apparatus comprising means for defining three variable angles of which the sum is invariably 180°, a source of voltage, means for deriving from the source a first voltage of magnitude proportional to the length of the known side, means for deriving simultaneously from the source a second and a third voltage individually adjustable in magnitude, means for deriving simultaneously from the first voltage a first sine fraction voltage and a first cosine fraction voltage proportional respectively to the sine and to the cosine of a first of the three angles and from the second voltage a second sine fraction voltage and a second cosine fraction voltage proportional respectively to the sine and to the cosine of a second of the three angles and means for adjusting said sine fraction voltages to equality with each other and means operable simultaneously with said last named means for summing the cosine fraction voltages and adjusting the magnitude of the third voltage to equality with the sum of the cosine fraction voltages.

22. For the solution of a plane triangle of which are known one angle, the lengths of the side opposite and of one side adjacent the known angle, a system of apparatus comprising means for defining three angles of which one equals the known angle and the sum is invariably 180°, a source of voltage, means for simultaneously deriving from the source a first and a second voltage of magnitudes representing individually the lengths of the known sides and a third voltage adjustable in magnitude, means for deriving simultaneously from the first voltage a first pair of fractional voltages proportional one to the sine and the other to the cosine of the known angle and from the second voltage a second pair of fractional voltages proportional one to the sine and the other to the cosine of a variable angle and means for varying the variable angle to effect equality of the sine fraction voltages and means operable simultaneously with said last named means for summing the cosine fraction voltages and adjusting the magnitude of the third voltage to equality with the sum of the cosine fraction voltages.

23. For the solution of a plane triangle of which are known the length of one side, the angle opposite and the two angles adjacent to the known side, a system of apparatus including means for defining the known angles, a source of voltage, means for deriving from the source a first, a second and a third voltage individually adjustable in magnitude, means for adjusting the magnitude of the first voltage to be proportional to the length of the known side, means for deriving simultaneously from the first voltage a sine fraction voltage and a cosine fraction voltage proportional respectively to the sine and to the cosine of one of the adjacent angles and from the second voltage a sine fraction voltage and a cosine fraction voltage proportional respectively to the sine and to the cosine of the opposite angle, means for adjusting the magnitude of the second voltage to effect equality of the sine fraction voltages thereby making the magnitude of the second voltage proportional to the length of the side opposite said one of the adjacent angles and means for summing the cosine fraction voltages and adjusting the magnitude of the third voltage to equality with the sum of the cosine fraction voltages whereby the magnitude of the third voltage is made proportional to the length of the side opposite the other of the adjacent angles.

24. For the solution of a plane triangle of which the lengths of the three sides are known, a system of apparatus comprising means for defining three variable angles of which the sum is invariably 180°, a source of voltage, means for deriving from the source a first, a second and a third voltage respectively proportional to the first, the second and the third of the known sides, means for deriving from the first voltage a pair of fractional voltages proportional respectively to the sine and to the cosine of a first variable angle, means for deriving from the second voltage a pair of fractional voltages proportional respectively to the sine and to the cosine of a second variable angle, means for summing the cosine fraction voltages and means for varying equally and oppositely the variable angles to effect simultaneously the equality of the sine fraction voltages with each other and the equality of the sum of the cosine fraction voltages with the third voltage.

25. In a computer for the automatic solution of a plane triangle of which are given the lengths of two sides and the angle opposite one of said sides, means for determining the unknown angles and the unknown third side of said triangle including a source of voltage, means for deriving from said source a first voltage representing the length of the one of said two sides opposite the given angle and a second voltage representing the length of the other of said two sides, means for deriving from said first voltage a first fractional voltage proportional to the cosine of the given angle and a second fractional voltage proportional to the sine of a variable angle, means for deriving from said second voltage a third fractional voltage proportional to the sine of the given angle and a fourth fractional voltage proportional to the cosine of the variable angle, means for varying the variable angle to effect equality of the second and the third fractional voltages whereby the variable angle becomes the angle of the triangle opposite the other of said two sides and the third angle of the triangle is determined as 180 degrees diminished by the sum of the given angle and the adjusted variable angle, means for deriving from said source a third voltage and means for varying said third voltage to equality with the sum of the first and the fourth fractional voltages whereby the magnitude of said third voltage is made representative of the unknown third side of the triangle.

26. Means as in claim 25 for the automatic solution of a plane triangle of which are given the lengths of two sides and the angle opposite one of said sides, wherein said angle varying means includes a servomotor controlled by a voltage proportional to the difference of the second and third fractional voltages and said voltage varying means includes a second servo motor controlled by a voltage proportional to the difference of the third voltage and the sum of the first and fourth fractional voltages.

27. Means as in claim 25 for the automatic solution of a plane triangle of which are given the lengths of two sides and the angle opposite one of said sides, wherein said angle varying means includes a servomotor controlled by a voltage proportional to the difference of the second and third fractional voltages and said voltage varying means includes a second servomotor controlled by a voltage proportional to the difference of the third voltage and the sum of the first and fourth fractional voltages, including switching means adapted to reverse the phase of the voltage controlling said first-named servomotor.

28. For the solution of a plane triangle of which are known the lengths of two sides and the angle thereby included, a system of apparatus comprising means for defining three angles of which one is the included angle and the sum is invariably 180 degrees, a source of voltage, means for deriving from the source a first voltage proportional to the length of one of the known sides and a second voltage proportional to the length of the other of the known sides, means for deriving from the first voltage a first and a second positional voltage proportional respectively to the sine and to the cosine of a first angle, means for deriving from the second voltage a third and a fourth fractional voltage proportional respectively to the negative sine and to the cosine of a second angle equal to the difference between the first angle and 180 degrees diminished by the known angle, means for equally and oppositely varying the first and second angles to make numerically equal the sine fraction voltages and means for summing the cosine fraction voltages.

References Cited in the file of this patent

FOREIGN PATENTS 164,765     Great Britain _ _ _ _ _ _ _ _ _ _ _ June 23, 1921